Nov. 3, 1970 J. J. PAKAN 3,538,463

MICROWAVE FILTER

Filed Nov. 22, 1966

Inventor
John J. Pakan
By Burmeister & Kulie
Attorneys 3,538,463

MICROWAVE FILTER

John J. Pakan, Boulder, Colo., assignor to A.R.F. Products, Inc., Raton, N. Mex., a corporation of Illinois Filed Nov. 22, 1966, Ser. No. 596,169
Int. Cl. H03h 7/08
U.S. Cl. 333—73 10 Claims

ABSTRACT OF THE DISCLOSURE

This disclosure sets forth a microwave filter which employs a first resonator coupled to a second resonator. The first and second resonators are disposed within a common electrically conducting shell which forms the outer conductor for both resonators. Each resonator has an inner conductor in the form of a helical coil, and the capacity between the two resonator coils capacitively couples the resonators. The microwave filter has an input terminal which is electrically coupled through means controlling the degree of coupling to the one inner conductor, and an output terminal which is coupled through a second means for controlling the degree of coupling to the other inner conductor. A filter to eliminate odd harmonics is incorporated in at least one of the coupling means. Each resonator is provided with a fine frequency tuning control.

The present invention relates to band pass filters, and particularly to such band pass filters as are usable in the microwave frequency range.

In the inventor's prior Pat. No. 3,074,035, filed Apr. 18, 1958, and Pat. No. 3,121,847 entitled "Frequency Selective Distribution Device," issued Feb. 18, 1964, the inventor has disclosed a band pass filter for microwaves utilizing a plurality of resonators coupled together in cascade. The filters disclosed in these patents have band passes determined by the degree of coupling between the filters, and the input and output coupling coefficients. By selection of these parameters, it is possible to achieve a filter with a narrow band pass and with a relatively abrupt transition between the pass band and the rejection bands on both higher and lower frequency sides of the pass band.

The filters disclosed in the inventor's prior patents are relatively costly to construct. The dimensions between the center conductor and the shell of the filter must be precise, and it is difficult to properly control the degree of coupling between resonators and the input coupling to the first resonator and the output coupling from the final resonator. It is an object of the present invention to provide a microwave filter which is less costly to construct than those heretofore known, which is less critical in dimensions, and which may be more readily fabricated.

It is also an object of the present invention to provide a filter for microwave use which has a small physical size, and light weight, and which achieves high selectivity and low insertion loss.

These and further objects and advantages of the present invention will be more fully appreciated from a further consideration of the specification, particularly when viewed in the light of the drawings, in which.

Figure 1:
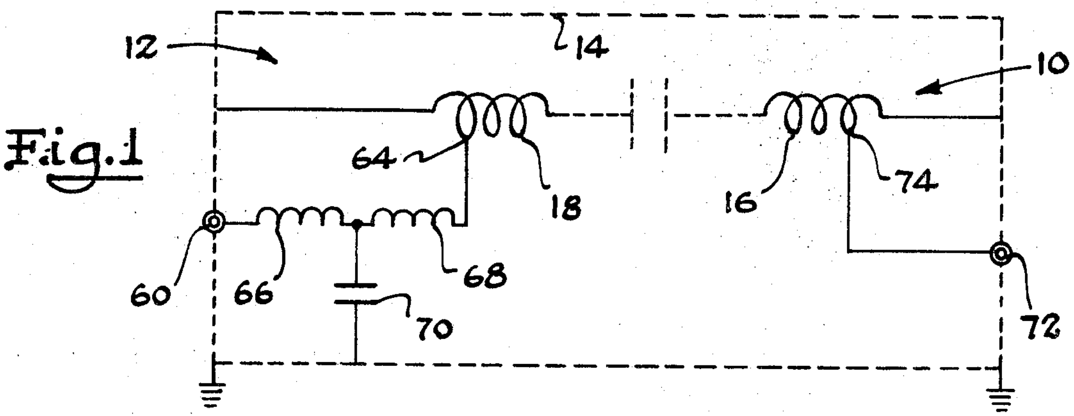
FIG. 1 is a schematic electrical circuit diagram of a filter constructed according to the teachings of the present invention.
Figures 2, 3, 4, 5:
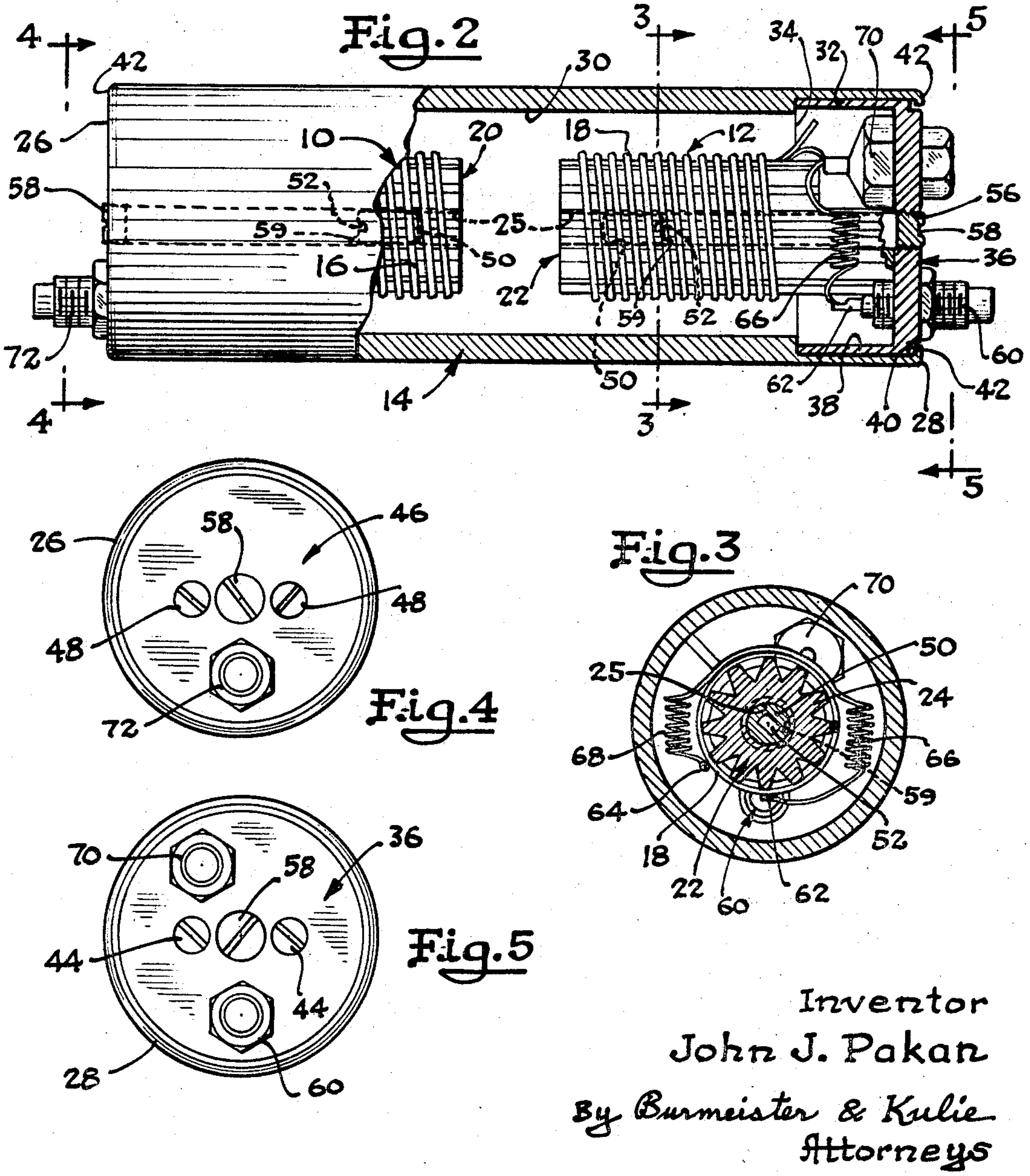
FIG. 2 is a front elevational view, partly broken away and in section, of a filter constructed according to the teachings of the present invention.
FIG. 3 is a sectional view taken along the line 3—3 of FIG. 2.
FIG. 4 is an end elevational view taken along the line 4—4 of FIG. 2.
FIG. 5 is an end elevational view taken along the line 5—5 of FIG. 2.

As illustrated in the figures, two separate resonators designated 10 and 12 are disposed within a common cylindrical electrically conducting shell 14. Each of the resonators 10 and 12 has an inner conductor in the form of a helical coil designated 16 and 18, respectively. The coil 16 is mounted on a coil form 20, and the coil 18 is mounted on a coil form 22. The coil forms 20 and 22 are identical in construction and have a central longitudinal axis coaxial with the shell 14 and a plurality of outwardly extending ribs 24 which terminate on a cylindrical surface coaxial with the axis of the form. The coils 16 and 18 are formed of elongated strips of electrically conducting material which is wound about the exterior surface of the forms 20 and 22 and cemented on the ends of the ribs 24. The coil forms 20 and 22 are constructed of a very low loss dielectric material, such as Rexolite, a product of the Brand-Rex Division of American Enka Corporation. Each of the coil forms 20 and 22 has a cylindrical axial channel 25 extending therethrough.

The coils 16 and 18 are essentially distributed elements, and the lengths of the strips of the coils 16 and 18 are approximately the same and equal to a quarter wavelength of the band pass frequency of the filter. The shell 14 and the coil 16 form one coaxial resonator which is generally of the type set forth in the Proceedings of the Institute of Radio Engineers, volume 47, No. 12, by MacAlpine and Schildknecht, entitled "Co-ax Resonators with Helical Inner Conductors," and the coil 18 and the shell 14 constitute a second such resonator. The spacing between the coil 16 and the coil 18 controls the capacitive coupling between the inner conductors of these resonators 10 and 12, and the coefficient of coupling between the resonators 10 and 12 is one of the properties which controls the characteristics of the band pass of the filter. As will be explained hereinafter, the spacing between the coils 16 and 18 is adjustable during assembly in order to provide the desired band pass characteristics for the filter.

The shell 14 has ends 26 and 28, and an inner surface 30. At both ends 26 and 28, a cylindrical recess 32 extends into the surface 30, thus forming a shoulder 34. An end cover 36 which is circular in shape, and has a cylindrical skirt 38 extending therefrom, is disposed within the cylindrical recess 32 at the end 28 of the shell 14, and the end of the skirt 38 remote from the end 28 of the shell is in abutment with the shoulder 34 to limit movement of the end cover 36. The end cover 36 is constructed of electrically conducting material and one end of the coil 18 is electrically connected to the end cover 36. The end cover 36 also has a peripheral groove 40 between the surface of the cylindrical recess 32 and the end cover 36, and this groove 40 permits the end of the shell to be formed over the end cover 36 to secure the end cover 36 on the shell, as shown at 42. It is not necessary to solder or otherwise provide a low loss electrical connection between the end cap 36 and the shell, because the large capacity between the skirt 38 of the end cap 36 and the recessed portion of the shell 14 provides a low impedance path at microwave frequencies, and this connection is not critical.

The coil form 22 is mounted on the end cover by a pair of threaded screws 44. A substantially identical end cover 46 is mounted in the end 26 of the shell 14 in a manner identical to that described for the end cover 36, and a pair of screws 48 secure the coil form 20 on the end cover 46. The spacing between the coils 16 and 18 may thus be changed by changing the length of the shell 14 or securing, as by solder, the end covers 36 and 46 to the shell 14 with the skirt 38 of the end covers spaced from the shoulder 34 of the shell. When filters are produced for a particular band pass frequency, it is not necessary to adjust the spacing between the coils 16 and 18, since the shoulders 34 will determine the position of the coils 16 and 18, and the ends 28 and 26 may be formed over the groove 40 in the end covers 36 and 46 to secure the end covers in place, as illustrated at 42. This simple manner of completing assembly together with the elimination of any solder connection between the end covers and the shell reduces manufacturing costs significantly.

A ferrite core 50 is translatably disposed within the channel 25 of the coil form 20 and 22. The ferrite core 50 is cylindrical in shape and has threads on its exterior surface which engage threads on the surface of the channel 25. The core 50 has a rectangular indentation 52 confronting the end cover 36, and the end cover 36 has a central opening 56. The opening 56 is threaded, and a threaded cap 58 is mounted in the opening to form a dust seal. A screwdriver may be inserted through the opening 56 when the cap 58 is removed to engage the rectangular slot 52 in the ferrite core 50 to adjust the resonant frequency of the resonator 12. Thereafter the screwdriver is removed, a mass of cement 59 placed on the ferrite core 50 to secure it in position, and the cap 58 replaced. An identical construction is disposed within the core 20 of the resonator 10.

A connector 60 is also mounted on the end cover 36 and extens therethrough. The connector 60 has an outer terminal which is electrically connected to the end cover 36 and an insulated inner terminal 62 which is connected to a tap 64 on the coil 18 through two serially connected coils 66 and 68. The junction of the coils 66 and 68 is coupled through a capacitor 70 to the shell 14, the capacitor 70 also being mounted on the end cover 36. The coils 66 and 68 and capacitor 70 comprise a low pass filter for substantially excluding passage of frequencies of a higher order than the principal resonant frequency of the resonators 10 and 12. The helical resonators are essentially distributed elements, and therefore produce multiple higher order resonances at frequencies corresponding to the odd harmonics of the principal resonant frequency. The use of a low pass filter comprising coils 66 and 68 and capacitor 70 substantially excludes passage of these higher frequencies when received from the connector 60. It is to be noted that the coils 66 and 68 are wound about axes disposed normal to the axis of the helical coil 18 to minimize coupling therewith.

A connector 72 is mounted on the end cover 46 and connected to a tap 74 on the coil 16, as illustrated in FIG. 1. No low pass filter is illustrated in this connection, however, since a low pass filter connected between the connector 60 and the coil 18 is generally sufficient to attenuate odd harmonics of the principal resonant frequency adequately, but a similar low pass filter may also be connected between the taps 74 and the connector 72 if greater attenuation is desired. Either the connector 60 or the connector 72 may be used as an input terminal, the other connector being the output terminal.

The taps 64 and 74 are selected to provide the desired input and output coupling coefficients. The location of the taps 64 and 74 and the spacing between the inner conductors formed by the coils 16 and 18 of the resonators 10 and 12 determines the band pass characteristics of the filter. The closer the tap is made to the grounded end of the coil, the higher the impedance between the tap and the shell. The low pass filter connected to the terminal 60, however, has the effect of inverting changes of impedance at the tap when measured at terminal 60.

After the ferrite cores 50 in the coils 16 and 18 have been adjusted to cause the resonators 10 and 12 to resonate at the frequency of the band pass, preferably the center frequency of the band pass, and the caps 58 have been replaced in the threaded openings 56 of the end covers 36 and 46, the exterior surface of the shell 14 and end covers 36 and 46 are coated with an epoxy to form a hermetic seal. Since the filter is designed to pass a particular band at a particular frequency, the taps 64 and 74 and the spacing between the coils 16 and 18 may be determined in advance and require no adjustment after construction.

In one particular construction of a filter according to the present invention designed to pass a frequency of approximately 150 megacycles, the diameter of the shell is approximately 1 inch and the length of the shell between the ends 26 and 28 is approximately 3$\frac{1}{16}$ inches. The filter weighs approximately 2¼ ounces. The coils 16 and 18 are constructed of No. 20 magnet wire, and have a Q of approximately 450. The diameter of the coils is approximately ½ inch, and the diameter of the channels 25 within the coil forms 20 and 22 are approximately $\frac{5}{32}$ inch.

Those skilled in the art will readily devise many modifications to the microwave filter set forth in this application, and will readily devise many applications for this filter. For example, means other than taps to determine the input and output coupling coefficients to the coupler may be utilized without departing from the spirit of the present invention, even though the particular construction here disclosed is preferable and contributes to the low cost of the disclosed filter. It is therefore intended that the scope of the present invention be not limited by the foregoing disclosure, but rather only by the appended claims.

The invention claimed is:

1. A microwave filter comprising a first resonator having an electrically conducting shell with a cavity therein and an inner conductor disposed in said cavity within the shell and spaced therefrom in the form of an elongated strip wound into the configuration of a first helical coil and having one end electrically connected to the shell at one end thereof.

input means coupled to the first strip for connecting said first strip to a source of microwave energy, a second resonator having a second inner conductor disposed within the same cavity in said shell and spaced therefrom, the second inner conductor being spaced from and capacitively coupled to the inner conductor of the first resonator, the inner conductor of the second resonator being in the form of a second elongated strip wound in the form of a second helical coil and having one end electrically connected to the shell at the opposite end thereof, said first and second helical coils being axially aligned in said shell and spaced apart end to end to provide capacitive coupling between the adjacent ends of said coils, and output means coupled to the second conductor for connecting said second conductor to a load, whereby a band of microwave frequencies centered about a frequency having a wavelength approximately four times the length of the conductors will be coupled from the microwave source to the load.

2. A microwave filter comprising the combination of claim 1 wherein the means for connecting the second conductor to a load comprises a tap on the coil formed by the second conductor.

3. A microwave filter comprising a first resonator having an electrically conducting shell and an inner conductor disposed within the shell and spaced therefrom in the form of an elongated strip wound into the confiuration of a first helical coil and electrically connected to the shell at one end, input means coupled to the first strip for connecting said first strip to a source of microwave energy.

a second resonator having a second inner conductor disposed within the shell and spaced therefrom, the second inner conductor being spaced from and capacitively coupled to the inner conductor of the first resonator, the inner conductor of the second resonator being in the form of a second elongated strip wound in the form of a second helical coil and electrically connected to the shell at the opposite end thereof, said first and second helical coils being axially aligned in said shell and spaced apart end to end to provide capacitive coupling between the adjacent ends of said coils, and output means coupled to the second conductor for connecting said second conductor to a load, whereby a band of microwave frequencies centered about a frequency having a wavelength approximately four times the length of the conductors will be coupled from the microwave source to the load, the means for connecting the second conductor to a load including a low pass filter for excluding passage of frequencies above the resonant frequency of the resonators.

4. A microwave filter comprising a first resonator having an electrically conducting shell and an inner conductor disposed within the shell and spaced therefrom in the form of an elongated strip wound into the configuration of a first helical coil and electrically connected to the shell at one end, input means coupled to the first strip for connecting said first strip to a source of microwave energy, a second resonator having a second inner conductor disposed within the shell and spaced therefrom, the second inner conductor being spaced from and capacitively coupled to the inner conductor of the first resonator, the inner conductor of the second resonator being in the form of a second elongated strip wound in the form of a second helical coil and electrically connected to the shell at the opposite end thereof, said first and second helical coils being axially aligned in said shell and spaced apart end to end to provide capacitive coupling between the adjacent ends of said coils, output means coupled to the second conductor for connecting said second conductor to a load, whereby a band of microwave frequencies centered about a frequency having a wavelength approximately four times the length of the conductors will be coupled from the microwave source to the load, a ferrite slug disposed within at least one of the helical coils, and means for translationally positioning said slug.

5. A microwave filter comprising the combination of claim 1 wherein the shell and said cavity therein are cylindrical and the first and second coils are disposed at opposite ends of the shell coaxial therewith.

6. A microwave filter comprising the combination of claim 1 wherein the means coupled to at least one of the strips for coupling said helical coil to an external circuit comprises a lead electrically connected to the first helical coil by a tap, said tap being spaced from the end of the coil connected to the shell.

7. A microwave filter comprising a first resonator having an electrically conducting shell and an inner conductor disposed within the shell and spaced therefrom in the form of an elongated strip wound into the configuration of a first helical coil and electrically connected to the shell at one end, first means coupled to the first strip for connecting said first strip to a source of microwave energy, a second resonator having a second inner conductor disposed within the shell and spaced therefrom, the second inner conductor being spaced from and capacitively coupled to the inner conductor of the first resonator, the inner conductor of the second resonator being in the form of a second elongated strip wound in the form of a second helical coil and electrically connected to the shell at the opposite end thereof, said first and second helical coils being axially aligned in said shell and spaced apart end to end to provide capacitive coupling between the adjacent ends of said coils, and second means coupled to the second conductor for connecting said second conductor to a load, whereby a band of microwave frequencies centered about a frequency having a wavelength approximately four times the length of the conductors will be coupled from the microwave source to the load, the means coupled to at least one of the strips for coupling said helical coil to an external circuit comprising a lead electrically connected to the first helical coil by a tap, said tap being spaced from the end of the coil connected to the shell, the last mentioned means including a low pass filter connected in series with the lead for attenuating frequencies above the principal resonant frequencies of the resonator.

8. A microwave filter comprising the combination of claim 7 wherein the low pass filter comprises a first coil and a second coil connected in series and to the tap of the helical coil of the resonator, and a capacitor connected between the junction of said first and second coils and the electrically conducting shell.

9. A microwave filter comprising a first resonator having an electrically conducting shell and an inner conductor disposed within the shell and spaced therefrom in the form of an elongated strip wound into the configuration of a first helical coil and electrically connected to the shell at one end, input means coupled to the first strip for connecting said first strip to a source of microwave energy, a second resonator having a second inner conductor disposed within the shell and spaced therefrom, the second inner conductor being spaced from and capacitively coupled to the inner conductor of the first resonator, the inner conductor of the second resonator being in the form of a second elongated strip wound in the form of a second helical coil and electrically connected to the shell at the opposite end thereof, said first and second helical coils being axially aligned in said shell and spaced apart end to end to provide capacitive coupling between the adjacent ends of said coils, and output means coupled to the second conductor for connecting said second conductor to a load, whereby a band of microwave frequencies centered about a frequency having a wavelength approximately four times the length of the conductors will be coupled from the microwave source to the load, said input means comprising a tap on said first helical coil, an input lead, and a low pass filter connected between said lead and said tap, said low pass filter comprising first and second filter coils disposed within said shell and connected in series between said lead and said tap, and a capacitor connected between said shell and the junction of said first and second filter coils.

10. A microwave filter according to claim 9, in which said first and second filter coils are positioned with their axes perpendicular to each other and also perpendicular to the axis of said first helical coil.

References Cited

UNITED STATES PATENTS

| | | | |
|---|---|---|---|
| 3,074,035 | 1/1963 | Pakan | 333—73 |
| 2,749,523 | 6/1956 | Dishal. | |
| 2,402,540 | 6/1946 | Espley. | |
| 3,065,434 | 10/1962 | Calderhead | 333—70 |
| 3,247,475 | 4/1966 | Buctow | 333—83 |
| 2,877,433 | 3/1959 | Devot. | |
| 2,163,775 | 6/1939 | Conklin | 333—79 |
| 2,753,530 | 7/1956 | Horvath. | |
| 3,159,803 | 12/1964 | Czubiak | 333—83 |

OTHER REFERENCES

W. W. MacAlpine Proc. Inst. Radio Eng., vol. 47, December 1959, p. 2099–2105.

HERMAN K. SAALBACH, Primary Examiner

C. BARAFF, Assistant Examiner

U.S. Cl. X.R.

333—76, 83